United States Patent
Ahn et al.

(10) Patent No.: US 9,755,210 B2
(45) Date of Patent: Sep. 5, 2017

(54) BATTERY PACK AND METHOD FOR CONTROLLING CHARGE OF BATTERY PACK

(71) Applicant: LG CHEM, LTD., Seoul (KR)

(72) Inventors: Seung-Pyo Ahn, Daejeon (KR); Hee-Gyu Kim, Daejeon (KR); Suk-Jin Song, Daejeon (KR); Jung-Bo Kim, Daejeon (KR); Young-Sun Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 302 days.

(21) Appl. No.: 14/496,658

(22) Filed: Sep. 25, 2014

(65) Prior Publication Data

US 2015/0010791 A1  Jan. 8, 2015

Related U.S. Application Data

(63) Continuation of application No. PCT/KR2014/002889, filed on Apr. 3, 2014.

(30) Foreign Application Priority Data

Apr. 10, 2013 (KR) .................. 10-2013-0039256

(51) Int. Cl.
*H01M 2/20* (2006.01)
*H01M 10/42* (2006.01)
(Continued)

(52) U.S. Cl.
CPC ............. *H01M 2/204* (2013.01); *H01M 2/30* (2013.01); *H01M 10/425* (2013.01);
(Continued)

(58) Field of Classification Search
CPC .. H01M 2/204; H01M 10/425; H01M 10/441; H01M 2/20; H01M 10/42; H01M 10/44

USPC ............................................ 429/50, 61, 121
See application file for complete search history.

(56) References Cited

U.S. PATENT DOCUMENTS

| 5,621,301 A | 4/1997 | Allen et al. |
| 2005/0035740 A1* | 2/2005 | Elder .................... B60L 3/0046 320/116 |

(Continued)

FOREIGN PATENT DOCUMENTS

| JP | 2001-23589 A | 1/2001 |
| JP | 2001023589 A * | 1/2001 ........... G06F 1/1635 |

(Continued)

OTHER PUBLICATIONS

International Search Report, issued in PCT/KR2014/002889, dated Aug. 12, 2014.

(Continued)

*Primary Examiner* — Karie O'Neill Apicella
(74) *Attorney, Agent, or Firm* — Birch, Stewart, Kolasch & Birch, LLP (57) ABSTRACT

A battery pack according to the present disclosure includes a battery cell including at least one unit cell, a first connector which is electrically connected to the battery cell, and a second connector which is electrically connected to the battery cell and the first connector, the second connector having a corresponding shape to the first connector to be coupled with the first connector.

According to the present disclosure, a plurality of battery packs may be concurrently charged, and when needed, a battery capacity may be increased by easily connecting a plurality of battery packs, thereby ensuring a sufficient usage time of an electronic appliance.

12 Claims, 5 Drawing Sheets

(51) Int. Cl.
  *H01M 10/44* (2006.01)
  *H01M 10/48* (2006.01)
  *H01M 2/30* (2006.01)
  *H01M 2/10* (2006.01)
  *H01M 10/46* (2006.01)
  *H02J 7/00* (2006.01)

(52) U.S. Cl.
  CPC ....... *H01M 10/441* (2013.01); *H01M 10/482* (2013.01); *H01M 10/488* (2013.01); *H02J 7/0021* (2013.01); *H01M 2/1066* (2013.01); *H01M 10/46* (2013.01); *H01M 2010/4271* (2013.01); *H02J 7/0016* (2013.01); *H02J 2007/0049* (2013.01)

(56) References Cited

U.S. PATENT DOCUMENTS

| | | | |
|---|---|---|---|
| 2007/0037049 A1* | 2/2007 | Iijima | ............... H01M 2/1061 429/99 |
| 2008/0265836 A1 | 10/2008 | Inoue et al. | |
| 2011/0050180 A1 | 3/2011 | Ko | |
| 2012/0139482 A1 | 6/2012 | Zhang et al. | |
| 2012/0268070 A1 | 10/2012 | Park et al. | |
| 2013/0249489 A1 | 9/2013 | Hwang | |

FOREIGN PATENT DOCUMENTS

| | | |
|---|---|---|
| JP | 2004-111227 A | 4/2004 |
| JP | 2006-294418 A | 10/2006 |
| JP | 2007-48662 A | 2/2007 |
| KR | 10-2012-0107302 A | 10/2012 |
| KR | 10-2013-0002912 A | 1/2013 |
| KR | 10-2013-0017110 A | 2/2013 |
| TW | 201039532 A1 | 11/2010 |
| TW | 201251176 A1 | 12/2012 |

OTHER PUBLICATIONS

Written Opinion of the International Searching Authority, issued in PCT/KR2014/002889, dated Aug. 12, 2014.

* cited by examiner

(12) United States Patent
US 9,755,210 B2

BATTERY PACK AND METHOD FOR CONTROLLING CHARGE OF BATTERY PACK

CROSS-REFERENCE TO RELATED APPLICATION

This application is a continuation of International Application No. PCT/KR20141002889 filed on Apr. 3, 2014, which claims priority to Korean Patent Application No. 10-2013-0039256 filed in the Republic of Korea on Apr. 10, 2013, the disclosures of which are incorporated herein by reference.

TECHNICAL FIELD

The present disclosure relates to a battery pack and a method for charging a battery pack, and more particularly, to a battery pack having a structure that allows it to be charged by a direct connection to a charger and that provides interconnection of a plurality of battery packs and a method for charging the battery pack.

BACKGROUND ART

Battery packs for use in mobile devices are moving towards higher performance, and particularly, their capacity to volume is gradually increasing.

However, portable devices, for example, smart phones or laptop computers, which becomes smaller but move towards diversity in function and a higher data processing rate, consume a greater amount of power, thereby it difficult to ensure a sufficient usage time with only one battery pack.

Accordingly, carrying at least two charged battery packs is needed, and in this case, to charge the respective battery packs, the battery packs are mounted on an electronic appliance body or a charger holder, and when connected to a charger, are charged.

However, mounting a plurality of battery packs on an electronic appliance body or a charger holder and then charging them individually may be very tedious. Furthermore, users have to repeatedly perform an operation of connecting a battery pack to a charger after a previous battery pack is fully charged, and inconveniently, during the operation, the users cannot do other task or sleep.

Therefore, in the charging of battery packs, there is a need for development of a battery pack having a structure that allows it to be charged by a direct connection to a charger without being mounted on an electronic appliance or a charger holder and that allows concurrent charging of a plurality of battery packs by interconnection of the battery packs.

DISCLOSURE

Technical Problem

The present disclosure is designed to solve the above problem, and therefore, it is an object of the present disclosure to provide a battery pack having a structure that allows it to be charged by a direct connection to a charger without being mounted on an electronic appliance or a charger holder and that allows concurrent charging of a plurality of battery packs by interconnection of the battery packs.

However, the object of the present disclosure is not limited to the above object, and other objects not mentioned herein will be clearly understood by those having ordinary skill in the art from the following description of the present disclosure.

Technical Solution

To achieve the above object, a battery pack according to the present disclosure includes a battery cell including at least one unit cell, a first connector which is electrically connected to the battery cell, and a second connector which is electrically connected to the battery cell and the first connector, the second connector having a corresponding shape to the first connector to be coupled with the first connector.

The battery pack may include a controller to selectively block an electrical connection of the first connector and the second connector or an electrical connection of the first connector and the battery cell based on a charge status of the battery cell.

The controller may block an electrical connection of the first connector and the battery cell when a state of charge (SOC) or a voltage value of the battery cell is higher than or equal to a predetermined reference value, and may block an electrical connection of the first connector and the second connector when the SOC or voltage value of the battery cell is less than the predetermined reference value.

The battery pack may further include a first switch connected between the first connector and the second connector to allow or block an electrical connection of the first connector and the second connector in response to the control signal outputted from the controller, and a second switch connected between the first connector and the battery cell to allow or block an electrical connection of the first connector and the battery cell in response to the control signal.

The battery pack may further include a power line to electrically connect the first connector, the second connector, and the battery cell.

The power line may include a first power line to connect the first connector with the second connector, and a second power line to connect the first power line with the battery cell.

The first switch may be installed on the first power line, and the second switch may be installed on the second power line.

The battery pack may further include a pack case to receive the battery cell.

The first connector may be exposed outside through a first surface of the pack case, and the second connector may be exposed outside through a second surface of the pack case.

The controller may output a charging completion signal when a SOC or a voltage value of the battery cell is higher than or equal to a reference value.

The battery pack may further include an indicator which is lighted on in response to the charging completion signal outputted from the controller.

Also, the above object may be achieved by a battery pack assembly implemented by connecting a plurality of battery packs according to the present disclosure, and in this case, adjacent battery packs may be interconnected by coupling of the first connector and the second connector.

Meanwhile, a method for controlling charge of a battery pack to achieve the above object controls the charge of the above battery pack, and includes (a) determining whether a charging current is flowing in through the first connector, (b) comparing a SOC of the battery cell to a reference SOC when the charging current is flowing in through the first connector, and (c) outputting a control signal to cause any one of an electrical connection of the first connector and the battery cell and an electrical connection of the first connector and the second connector to be selected based on a result of the comparison.

The step (c) may include outputting a control signal to cause the first connector and the battery cell to be electrically connected when the SOC of the battery cell is less than the reference SOC, and outputting a control signal to cause the first connector and the second connector to be electrically connected when the SOC of the battery cell is higher than or equal to the reference SOC.

Advantageous Effects

According to one aspect of the present disclosure, when charging a battery pack, charging is possible by directly connecting a battery pack to a charger while eliminating the need to mount the battery pack on an electronic appliance or a charger holder.

According to another aspect of the present disclosure, concurrent charging is possible by connecting a plurality of battery packs with each other.

BRIEF DESCRIPTION OF THE DRAWINGS

The accompanying drawing illustrates a preferred embodiment of the present disclosure and together with the foregoing disclosure, serves to provide further understanding of the technical spirit of the present disclosure, and thus, the present disclosure is not construed as being limited to the drawing.

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, a battery pack 10 according to an exemplary embodiment of the present disclosure is described with reference to FIGS. 1 and 2.

Figure 1:
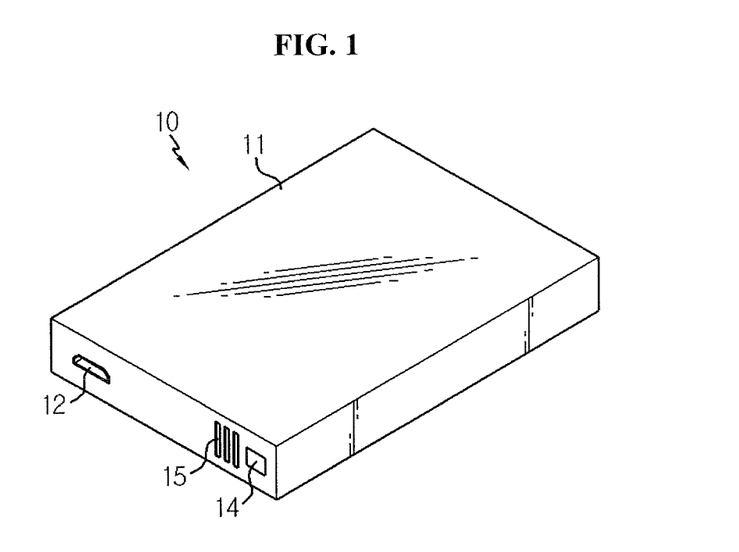
FIG. 1 is a perspective view illustrating a battery pack according to an exemplary embodiment of the present disclosure in which a first connector is seen.
Figure 2:
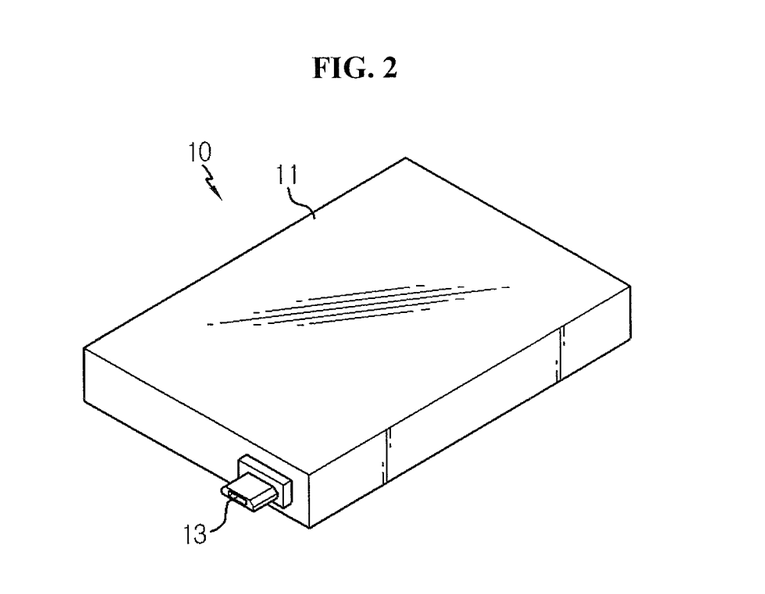
FIG. 2 is a perspective view illustrating a battery pack according to an exemplary embodiment of the present disclosure in which a second connector is seen.

Referring to FIGS. 1 and 2, the battery pack 10 according to an exemplary embodiment of the present disclosure includes a battery cell (B in FIG. 4) composed of at least one unit cell, a pack case 11 which receives the battery cell, a first connector 12 exposed outside through a first surface of the pack case 11, and a second connector 13 exposed outside through a second surface of the pack case 11. Also, the battery pack 10 may further include an external terminal 15 which is electrically connected to the battery cell B and exposed outside through the pack case 11, and an indicator to indicate a charge status of the battery pack 10 in a lighting manner.

The first connector 12 is electrically connected to the battery cell B, and may function as a connection terminal to which a charger connector C is connected that provides an electrical connection of a plurality of battery packs 10. The first connector 12 may be implemented in various types, for example, a female connector formed not to protrude outside of the pack case 11, and may be formed with various numbers of pins, for example, 16-pin, 30-pin, and the like.

The second connector 13 is electrically connected to the first connector 12 through an internal circuit, and on the pack case 11, is exposed outside through a different surface from an exposed surface of the first connector 12. Also, the second connector 13 has a corresponding shape to the first connector 12 such that the second connector 13 is coupled with the first connector 12 for adjacent battery packs 10 to be physically/electrically connected to each other. That is, the second connector 13 may be, for example, a male connector having a shape of protruding outside of the pack case 11, and is formed with the same number of pins as the first connector 12.

Meanwhile, although the drawing of the present disclosure just shows the first connector 12 in a type of a female connector and the second connector 13 in a type of a male connector, the present disclosure is not limited in this regard. That is, contrary to illustration, the first connector 12 in a type of a male connector and the second connector 13 in a type of a female connector may be contemplated.

Figure 3:
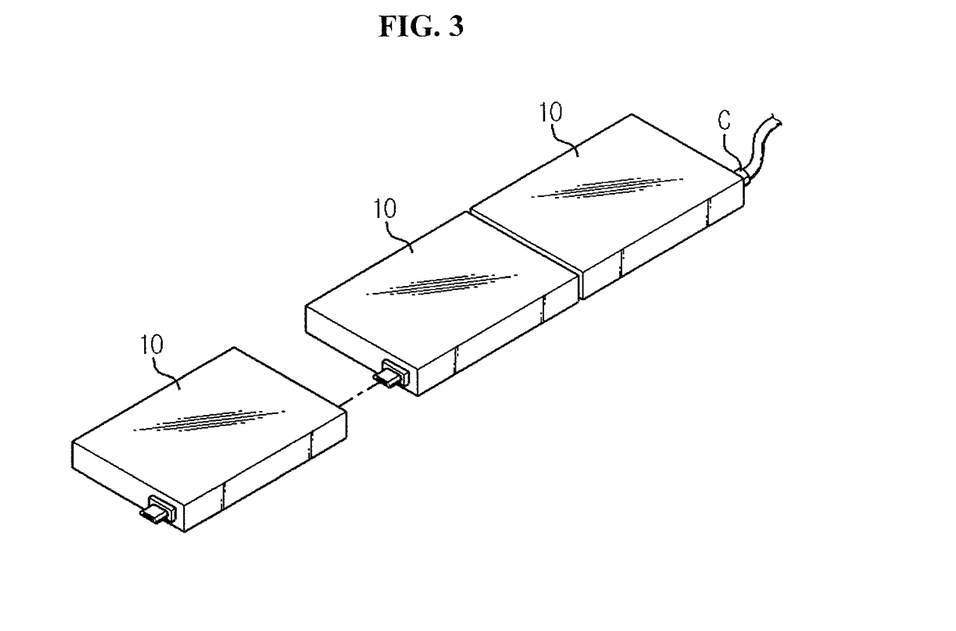
FIG. 3 is a perspective view illustrating a battery pack assembly implemented by connecting a plurality of battery packs according to an exemplary embodiment of the present disclosure.

Referring to FIG. 3, a battery pack assembly may be implemented by connecting a plurality of battery packs 10 by coupling the first connector 12 with the second connector 13.

The battery pack assembly may be charged in a sequential order when connected to the charger connector C through the first connector 12.

That is, charging of the battery pack assembly may be performed by charging a next battery pack 10 after completing the charge of a battery pack 10 directly connected to a charger. Here, a point in time at which charging of one battery pack 10 is completed represents a point in time at which a state of charge (SOC) or a voltage value of the battery pack 10 is higher than or equal to a predetermined reference value, and is a concept encompassing fully charging.

This sequential charging may be implemented by an electrical connection or a connection release of the first connector 12 and the battery cell B equipped in each battery pack 10 and an electrical connection or a connection release of the first connector 12 and the second connector 13. An example of a circuit configuration allowing sequential charging will be described in detail below with reference to FIG. 4.

Figure 4:
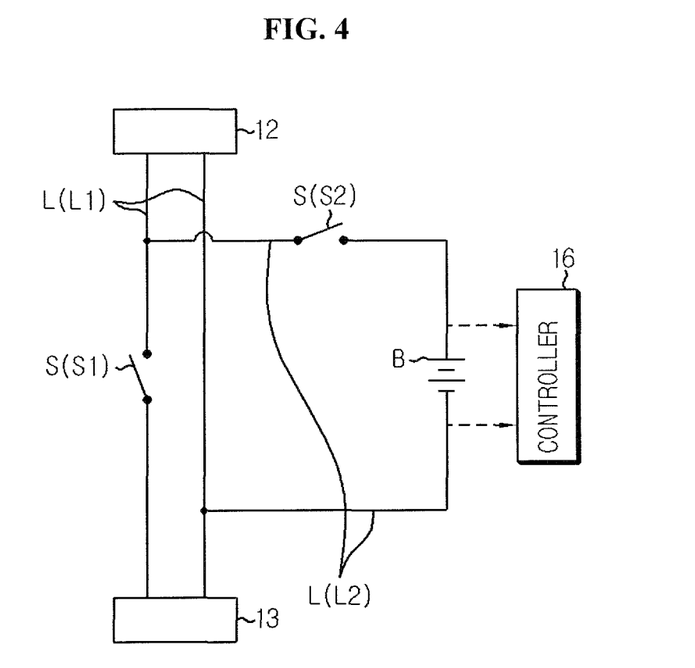
FIG. 4 is a diagram illustrating an internal circuit configuration of a battery pack according to an exemplary embodiment of the present disclosure.

Referring to FIG. 4, the battery pack 10 may further include a power line L to electrically connect the first connector 12, the second connector 13 and the battery cell B, a switch S installed on the power line L, and a controller 16 to control a switching operation of the switch S.

The power line L includes a first power line L1 to connect the first connector 12 with the second connector 13 and a second power line L2 to connect the battery cell B with the first power line L1. A person having ordinary skill in the art will understand that each of the power lines L1 and L2 includes a high potential line connected with a positive electrode of the battery cell B and a low potential line connected with a negative electrode of the battery cell B. Also, it is obvious that the high potential line of the first power line L1 is connected with the high potential line of the second power line L2, and the low potential line of the first power line L1 is connected with the low potential line of the second power line L2.

The switch S is installed on the power line L to allow or block an electrical connection of the first connector 12, the second connector 13 and the battery cell B, and a number of switches S to be installed and an installation location may be variously determined. For example, the switch S may include a first switch S1 installed on the first power line L1 and a second switch S2 installed on the second power line L2.

The first switch S1 serves to allow or block an electrical connection of the first connector 12 and the second connector 13, and the second switch S2 serves to allow or block an electrical connection of the first connector 12 and the battery cell B. A flow of charging current by a switching operation of the switches S1 and S2 will be described in detail below.

Although the drawing of the present disclosure just shows the switches S1 and S2 installed on the high potential line, this is for the purpose of illustration only and the present disclosure is not limited thereto, and the switches S1 and S2 may be installed on any line of the high potential line and the low potential line.

The controller 16 may calculate a SOC of the battery cell B using a voltage across both ends of the battery cell B and/or a voltage across both ends of each unit cell constituting the battery cell B and/or an electric current flowing through the second power line L2, and may manage the charge of the battery cell B by referring to the calculated SOC.

Also, when the battery pack B is in a charge mode, that is, when the first connector 12 is connected to the charger, the controller 16 outputs a switching control signal B to cause each of the switches S1 and S2 to perform a switching operation independently based on the SOC of the battery cell. Here, whether or not the battery pack B is in a charge mode may be detected by, for example, a current sensor connected on the power line L.

More specifically, when the SOC of the battery cell B is less than the predetermined reference value, the controller 16 outputs a switching control signal to cause the first switch S1 to be in an OFF state and the second switch S2 to be in an ON state. Accordingly, a charging current is supplied to the battery cell B, whereas a charging current is not supplied to an adjacent battery pack 10 connected through the second connector 13.

Also, when an amount of charge in the battery cell B is higher than or equal to a reference value, that is, when the SOC of the battery cell B is higher than or equal to the predetermined reference value, the controller 16 outputs a switching control signal to cause the first switch S1 to be in an ON state and the second switch S2 to be in an OFF state.

Accordingly, a charging current is not supplied to the battery cell B any longer, and a charging current is supplied to an adjacent battery pack 10 connected through the second connector 13. Here, the SOC higher than or equal to the reference value corresponds to a concept encompassing fully charging as described in the foregoing.

Meanwhile, in the case where the indicator 14 is equipped in the battery pack 10 according to the present disclosure to indicate that charging is completed, the controller 16 may be set to output a charging completion signal when the SOC of the battery cell B is higher than or equal to the reference value. In this case, in response to the charging completion signal outputted from the controller 16, the indicator 14 is lighted on to notify a user of charging completion.

As described in the foregoing, because the battery pack 10 according to the present disclosure includes the first connector 12, the battery pack 10 has a structure that allows a direct connection to the charger. Also, as the battery pack 10 includes the first connector 12 and the second connector 13 having a corresponding shape to the first connector 12, the battery pack 10 has a structure that allows concurrent charging in a state of a battery pack assembly constructed by connecting a plurality of battery packs.

Furthermore, as the battery pack 10 according to the present disclosure includes the internal circuit to change a flow of charging current based on the SOC of the battery cell B, sequential charging is feasible.

Hereinafter, a method for controlling the charge of the battery pack 10 according to an exemplary embodiment of the present disclosure is described with reference to FIG. 5.

Figure 5:
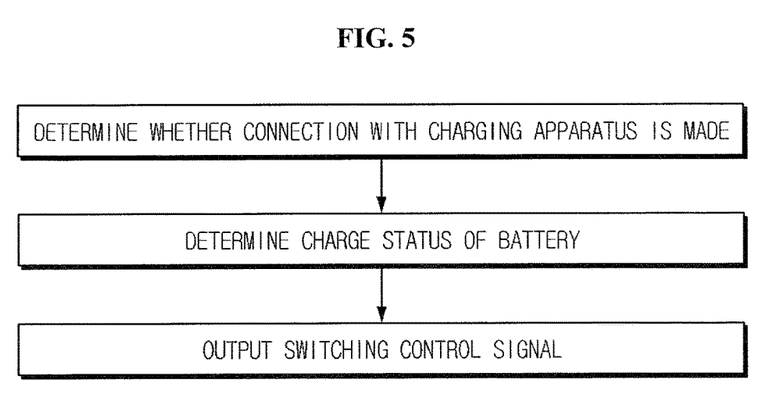
FIG. 5 is a flowchart illustrating a method for controlling charge of a battery pack according to an exemplary embodiment of the present disclosure.

Referring to FIG. 5, the method for controlling the charge of the battery pack according to an exemplary embodiment of the present disclosure includes (a) determining whether or not a connection with a charging apparatus is made, (b) determining a charge status of a battery, and (c) outputting a switching control signal.

The step (a) is a step of determining whether or not a charging current is flowing in through the first connector 12 equipped in the battery pack 10. Here, determination as to whether or not a charging current is flowing in may be made using a current sensor connected on the power line L.

The step (b) is a step of comparing a SOC of the battery cell B to a reference SOC in the case where the charging current is flowing in through the first connector 12. Here, the reference SOC represents a SOC when the battery cell B is sufficiently charged, and is a concept encompassing a SOC of the fully charged battery cell B as described in the foregoing.

The step (c) is a step of outputting a control signal to cause any one of an electrical connection of the first connector 12 and the battery cell B and an electrical connection of the first connector 12 and the second connector 13 to be selected based on a result of the comparison at the step (b). The control signal corresponds to a concept encompassing a first control signal and a second control signal of different types. Here, the first control signal is a control signal which causes the first connector 12 and the battery cell B to be electrically connected when the SOC of the battery cell B is lower than the reference SOC, and the second control signal is a control signal which causes the first connector 12 and the second connector 13 to be electrically connected when the SOC of the battery cell B is higher than or equal to the reference SOC.

Also, in the description of the present disclosure, it should be understood that each element constituting the circuit shown in FIG. 4 is distinguished logically rather than physically.

That is, each element corresponds to a logic element to realize the technical spirit of the present disclosure, and accordingly, even though each element is integrated or separated, it should be construed as falling within the scope of the present disclosure if a function performed by a logic element of the present disclosure can be implemented. It should be further understood that it falls within the scope of the present disclosure regardless of whether names are identical or not if it is an element performing an identical or similar function.

Hereinabove, the present disclosure has been described by limited embodiments and drawings, but the present disclosure is not limited thereto and it should be understood that various changes and modifications may be made by an ordinary person skilled in the art within the spirit and scope of the disclosure and the appended claims and their equivalents.

What is claimed is:

1. A battery pack comprising:
   a battery cell comprising at least one unit cell;
   a first connector which is electrically connected to the battery cell;
   a second connector which is electrically connected to the battery cell and the first connector, the second connector having a corresponding shape to the first connector to be coupled with the first connector; and
   a controller to selectively block an electrical connection of the first connector and the second connector or an electrical connection of the first connector and the battery cell based on a charge status of the battery cell,
   wherein the controller blocks an electrical connection of the first connector and the battery cell when a state of charge (SOC) or a voltage value of the battery cell is higher than or equal to a predetermined reference value, and blocks an electrical connection of the first connector and the second connector when the SOC or voltage value of the battery cell is less than the predetermined reference value.

2. The battery pack according to claim 1, further comprising:
   a first switch connected between the first connector and the second connector to allow or block an electrical connection of the first connector and the second connector in response to a control signal outputted from the controller; and
   a second switch connected between the first connector and the battery cell to allow or block an electrical connection of the first connector and the battery cell in response to the control signal.

3. The battery pack according to claim 2, further comprising:
   a power line to electrically connect the first connector, the second connector, and the battery cell.

4. The battery pack according to claim 3, wherein the power line comprises:
   a first power line to connect the first connector with the second connector; and
   a second power line to connect the first power line with the battery cell.

5. The battery pack according to claim 4, wherein the first switch is installed on the first power line, and the second switch is installed on the second power line.

6. The battery pack according to claim 1, further comprising:
   a pack case to receive the battery cell.

7. The battery pack according to claim 6, wherein the first connector is exposed outside through a first surface of the pack case, and the second connector is exposed outside through a second surface of the pack case.

8. The battery pack according to claim 1, wherein the controller outputs a charging completion signal when a SOC or a voltage value of the battery cell is higher than or equal to a reference value.

9. The battery pack according to claim 8, wherein the battery pack further comprises an indicator which is lighted on in response to the charging completion signal outputted from the controller.

10. A battery pack assembly implemented by connecting a plurality of battery packs defined in claim 1.

11. The battery pack assembly according to claim 10, wherein adjacent battery packs are interconnected by coupling of the first connector and the second connector.

12. A method for controlling charge of a battery pack defined in claim 1, the method comprising:
    (a) determining whether a charging current is flowing in through the first connector;
    (b) comparing a state of charge (SOC) of the battery cell to a reference SOC when the charging current is flowing in through the first connector; and
    (c) electrically connecting the first connector and the battery cell when the SOC of the battery cell is less than the reference SOC, and electrically connecting the first connector and the second connector when the SOC of the battery cell is higher than or equal to the reference SOC.

* * * * *